United States Patent [19]

Schmid

[11] 4,015,618
[45] Apr. 5, 1977

[54] APPARATUS FOR AUTOMATICALLY MIXING AND CIRCULATING CLEANING SOLUTIONS THROUGH DAIRY EQUIPMENT

[75] Inventor: Rolyn A. Schmid, Hayward, Wis.

[73] Assignee: Bender Machine Works, Inc., Hayward, Wis.

[22] Filed: Nov. 24, 1975

[21] Appl. No.: 634,876

[52] U.S. Cl. ............................... 137/93; 134/58 R
[51] Int. Cl.² ...................... G05D 11/08; B08B 9/08
[58] Field of Search ..................... 137/93, 824.11; 134/57 R, 58 R, 99, 101, 171; 222/70; 417/12

[56] References Cited
UNITED STATES PATENTS

| | | | |
|---|---|---|---|
| 3,554,212 | 1/1971 | Maroney | 137/93 |
| 3,592,212 | 7/1971 | Schleimer | 137/93 |
| 3,607,549 | 9/1971 | Bielefeld, Jr. | 137/93 X |
| 3,729,013 | 4/1973 | Anderson | 137/93 |
| 3,802,447 | 4/1974 | Bender | 134/57 R |

Primary Examiner—William R. Cline
Attorney, Agent, or Firm—James E. Nilles

[57] ABSTRACT

Apparatus is disclosed for automatically mixing and circulating cleaning solutions through dairy equipment, such as in-place milk line equipment, bulk storage tanks, or the like. The apparatus comprises individual pumps for supplying ingredients, such as a detergent, an acid and a sanitizer, in a predetermined sequence to a mixing receptacle for mixing with a solvent such as water to form different types of cleaning solutions which are then circulated by a main pump through the equipment in a predetermined sequence. Control means, including a timer, are provided to fill the mixing receptacle with water and to operate the individual pumps and the main pump in a predetermined sequence to provide desired cycles of operation, such as first rinse (with water), wash (with detergent), second rinse (with acid), OFF, sanitize (with sanitizer), and OFF. The control means further includes electrical probe means for sensing the pH value of the cleaning solution to determine the amount of an ingredient being added by an individual pump during an appropriate cycle and for stopping that individual pump when the pH value reaches a predetermined level thereby indicating that a predetermined amount of the ingredient has been added.

22 Claims, 11 Drawing Figures

APPARATUS FOR AUTOMATICALLY MIXING AND CIRCULATING CLEANING SOLUTIONS THROUGH DAIRY EQUIPMENT

BACKGROUND OF THE INVENTION

Reference to Related Application

The present application relates to and is an improvement over my co-pending U.S. patent application Ser. No. 510,314, filed Sept. 30, 1974, for "Apparatus for Automatically Mixing a Cleaning Solution for Automatic Cleaning Equipment for Dairies or the Like", now U.S. Pat. No. 3,921,652.

Field of Use

This invention relates to apparatus for automatically mixing and circulating cleaning solutions through dairy equipment, such as in-place milk line equipment, bulk storage tanks, or the like. The apparatus comprises individual pumps for supplying ingredients, such as a detergent, or an acid, and a sanitizer, to a mixing receptacle for mixing with a solvent such as water to form a cleaning solution and a main pump for circulating the cleaning solution through the equipment. Control means, including a timer, are provided to operate the individual pumps and the main pump in a predetermined sequence to provide desired cycles of operation. The control means further includes means for sensing the amount of an ingredient being added by an individual pump during an appropriate cycle and for stopping that individual pump when a predetermined amount of the ingredient has been added.

Description of the Prior Art

Many types of dairy equipment or other equipment are required to be cleaned-in-place and this cleaning must be made frequently in order to comply with the sanitation laws of the various states. Various ingredients must be used in the cleaning solution to insure absolute cleaning of the interior of the pipes, etc., for example, an acid must be used to cut the residue milk from the pipes in milking systems. A detergent is also used to thoroughly clean the equipment, and when the cleaning cycle is finished, the system must be flushed with clear water and then preferably sanitized by means of a sanitizer. As a result, various sequences of cleaning operations must be performed in timed relationship in such equipment. One example of milk line equipment with which the present invention finds utility is shown in the U.S. Pat. No. 3,191,576 issued June 29, 1965, to L. F. Bender and entitled "Milk Line Releaser and Washing Apparatus." That apparatus utilizes automatically operated releaser apparatus of the vacuum type and in which the cleaning solution is held in a large tank and circulated through the milk line and vacuum releaser apparatus to thoroughly clean the same.

Another example of equipment with which the present invention finds utility is shown in U.S. Pat. No. 3,802,447, issued April 9, 1974, to L. F. Bender and entitled "Automatic Tank Washer with Spin-Burst Mechanism for Washing, Rinsing, and Sanitizing." That apparatus automatically washed milk storage tanks by means of appropriate steps in a washing cycle.

Reference may be had to my co-pending U.S. patent application Ser. No. 510,314 now U.S. Pat. No. 3,921,652, hereinbefore described, for an example of apparatus of a type with which the present invention may be advantageously employed.

SUMMARY OF THE INVENTION

This invention relates to apparatus for automatically mixing and circulating cleaning solutions through dairy equipment, such as in-place milk line equipment, bulk storage tanks, or the like. The apparatus comprises individual piston-type pumps for supplying ingredients, such as a detergent, or an acid, and a sanitizer, from their separate storage containers to a mixing receptacle for mixing with a solvent such as water to form a cleaning solution. The apparatus further comprises solenoid valve means for periodically supplying water to the mixing receptacle and a main pump for circulating the cleaning solution through the equipment. Control means, including a timer, are provided to operate the individual pumps, the solenoid valve, and the main pump in a predetermined sequence to provide desired cycles of operation. The control means further includes means for sensing the amount of an ingredient being added by an individual pump during an appropriate cycle and for stopping that individual pump when a predetermined amount of the ingredient has been added.

In a preferred embodiment of the invention, each piston-type pump extracts an ingredient (detergent, acid, or sanitizer) from a storage container and then discharges the ingredient into a mixing tank or receptacle to be mixed with a solvent such as water to form a cleaning solution which is then circulated by a main pump through the equipment. Several such piston-type pumps and their respective storage tanks are employed in a preferred embodiment, and control means are provided for these piston-type pumps and for the main pump.

The control means are provided to actuate the pumps in a predetermined sequence and to stop pump operation when a predetermined amount of ingredient being delivered by a particular pump has been added to the solvent. The control means includes a timer which establishes cycles of operation and, for example, a particular pump is actuated during certain cycles. For example, a predetermined sequence may comprise a first rinse cycle, a wash cycle, a second rinse cycle, an OFF cycle, a sanitizer cycle, and a final OFF cycle. During the first rinse cycle, the main pump but no piston-type pump operates. During the wash cycle, the main pump and the detergent pump operate. During the second rinse cycle, the main pump and the acid pump operate. During the sanitizer cycle, the main pump and the sanitizer pump operate. During both OFF cycles, neither the main pump nor any piston-type pumps operate. During a cycle of operation when a piston-type pump is operating, in response to operation of the timer means, the sensing means, which include a probe for detecting the pH level of the cleaning solution, senses when a predetermined desired pH level is reached (indicative that a solution of proper strength is available) and stops that particular piston-type pump. The pH level or value is determined by measuring the electrical conductivity of the cleaning solution by passing alternating current therethrough and employing a control unit, including a relay responsive to the probe, to deenergize the electric motor for the particular piston-type pump.

Apparatus in accordance with the invention offers several advantages over prior art apparatus. For example, the strength of the cleaning solution is more accurately controlled since the actual pH level of the cleaning solution is being measured and there is no reliance on a measured interval of time as the measure for ascertaining the amount of ingredient that is being added to form the cleaning solution. Furthermore, a single probe is useable to measure the pH level of the cleaning solution, regardless of whether detergent, acid, or sanitizer is being utilized to form the solution. Apparatus in accordance with the present invention is economical to fabricate and employs commercially available control components, such as the sensing probe and the control relays operated thereby. The apparatus is trouble-free and reliable in use. Other objects and advantages of the invention will hereinafter appear.

DESCRIPTION OF A PREFERRED EMBODIMENT

Figure 2:
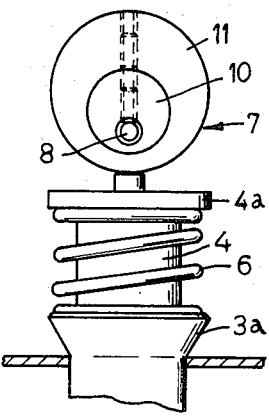
FIG. 2 is an enlarged, fragmentary elevational view taken generally along the line 2—2 in FIG. 1 and showing the eccentric means and the upper portion of the pump.
Figure 1:
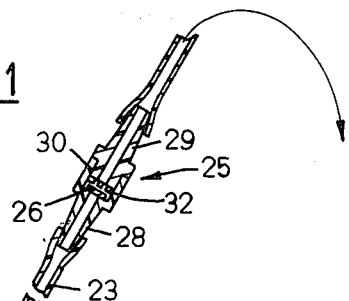
FIG. 1 is a cross sectional, elevational view of the apparatus for automatically mixing a cleaning solution in accordance with the present invention.

FIG. 1 illustrates one of the pumping apparatus used with the present invention. A separate container 1 is used for each of several materials of which a cleaning solution is comprised. Any number of these containers may be used along with their individual pump and these materials may comprise a detergent, an acid, a sanitizer, or other chemicals. Furthermore, these containers may be of various sizes and large enough so that the operator need replenish them infrequently. The apparatus also includes an extensible and contractable piston type pump 2 which includes a plastic cylinder 3 in which a reciprocating piston 4 is mounted so as to form a pumping chamber 5 therebetween. The cylinder has an outwardly flared flange 3a turned around one end and the piston is made of plastic and has a radial flange 4a around one end. The pumping unit is extended by a spring 6 located outside the pump and encircling the piston and acting between the flange of the cylinder and piston. The pump is thereby easy to assemble and diassemble and readily cleaned. The spring cannot be subjected to the material it is pumping.

Figure 3:
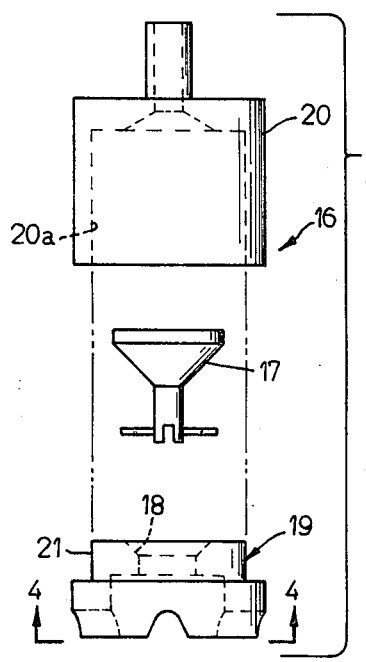
FIG. 3 is an enlarged, exploded view of portions of the one-way valve shown in the lower end of the storage container in FIG. 1.
Figure 5:
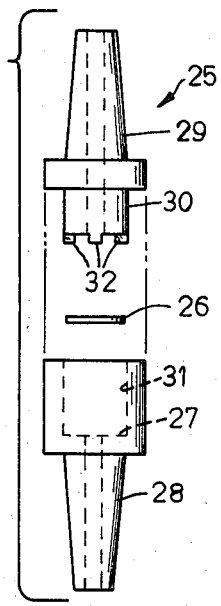
FIG. 5 is an enlarged, exploded view of the check valve shown in the conduit in FIG. 1.
Figure 4:
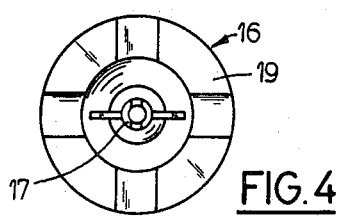
FIG. 4 is a view taken along the line 4—4 in FIG. 3.

The pumping stroke is applied to the piston by an eccentric 7 driven by shaft 8 from the electric motor 9. The throw of the rotary eccentric 7 is adjustable by means of adjusting the rotary inner eccentric portion 10 relative to the outer portion 11 and suitable set screws are provided, as shown, for locking the portions in the desired position relative to one another. The eccentric contacts the upper end of the plunger for driving it in a pumping direction. The chamber 5 is connected by means of a flexible conduit 13 to a Y fitting 14 which in turn is connected by a tube 15 within the vessel. The tube 15 has a one-way check valve 16 located at its lower end and at the bottom of the interior of the container 1. This check valve is shown in detail in FIG. 3 and includes a shiftable, tapered valve element 17 that seals against a corresponding seat 18 of the lower portion 19 of the valve. The upper portion 20 of the valve surrounds the valve element 17 and the bore 20a of portion 20 is press-fit onto the annular surface 21 of the portion 19 of the valve. The other leg of the Y fitting 14 is connected by another conduit 23 that acts to carry the discharged fluid as will appear, to a vessel or other tank, to be described, where the mixing of the various fluid materials takes place to form a cleaning solution. The conduit 23 has a one-way check valve 25 located therein and this valve is shown in detail in FIG. 5. The valve 25 includes a disc 26 that seats against an internal surface 27 of the lower portion 28 of the valve so as to prevent return of fluid in one direction, that is downwardly into the container 1. An upper portion 29 has a reduced part 30 which is removably pressed into the bore 31 of the lower portion 28. Spaced apart feet 32 on the end of part 30 prevent disc 26 from sealing against portion 29.

The action of the pump is such that when the pump is extended by the spring 6, it acts to draw fluid through the valve 16 in the bottom of the container 1 and upwardly into the conduit 13. The volume of the conduit 13 is of such a volume, compared to the capacity of the pump, so that the material sucked up by the pump does not enter the pump chamber 5. When the motor 9 then drives the plunger inwardly to effect a pumping stroke, valve 16 closes and the fluid is pumped upwardly through the conduit 23, through the one-way check valve 25, and into the mixing tank to be referred to. When the pump 2 is extended to again effect a suction stroke, the one-way valve 25 closes and valve 16 opens.

The pump includes sealing rings 8 to form an air-tight seal due to the compression of the O-rings 8 between the piston and cylinder.

FIGURES 6–8 ENVIRONMENT

Figure 6:
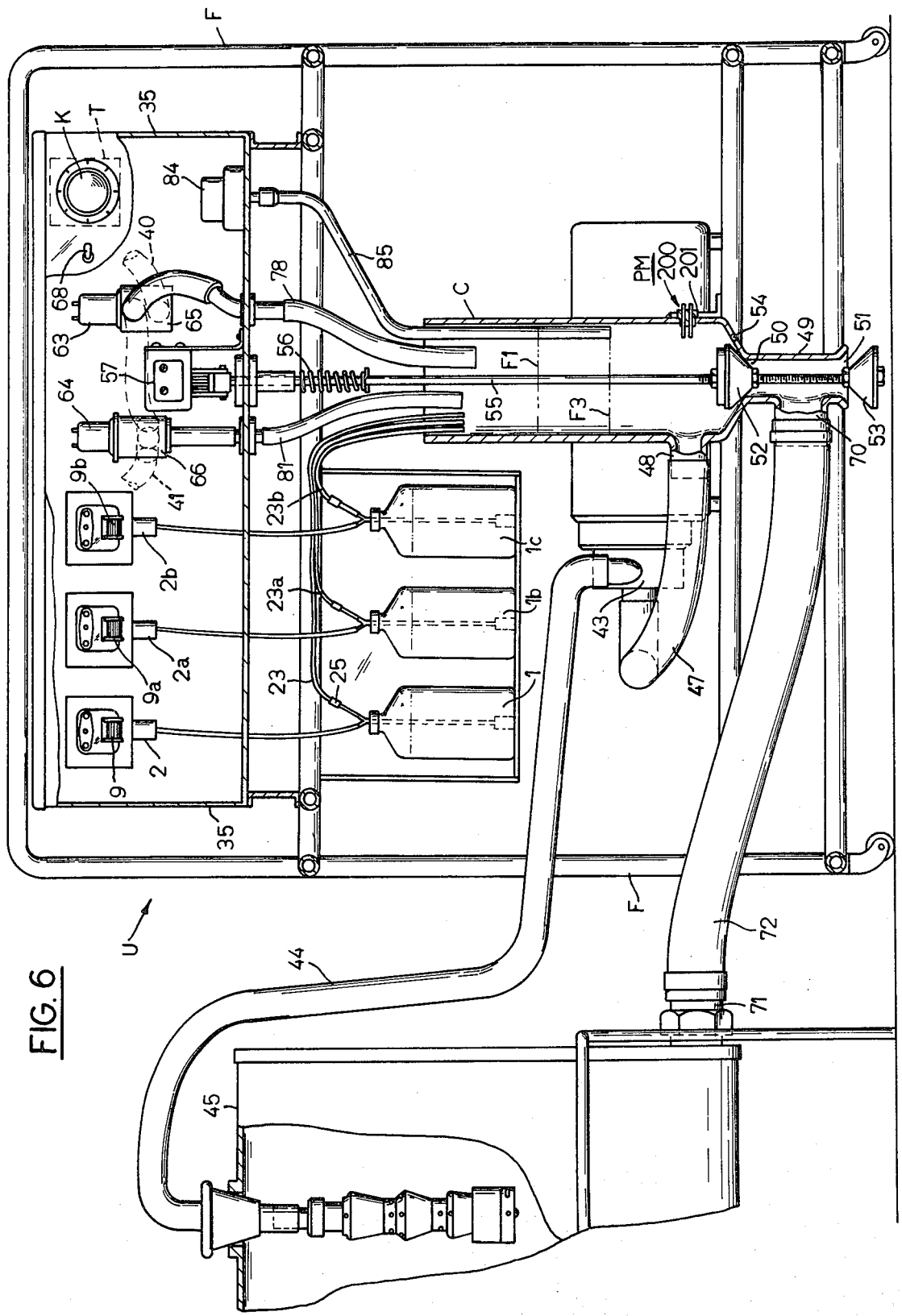
FIG. 6 shows a plurality of cleaning apparatus as shown in FIG. 1 when used in cleaning a bulk tank.

The apparatus shown in FIG. 6 illustrates one form of equipment with which the present invention is used.

As previously mentioned, several of the apparatus as shown in FIG. 1 are usable with the present invention, one for each of any number of materials to be mixed into a cleaning solution. The motors 9 of the various apparatus are operated in timed sequence by cams driven by a timer as will appear.

A series of pumping apparatus as in FIG. 1 are shown as they are physically arranged in a control box 35 in FIG. 6. It will be noted that a number of containers 1, 1a, and 1b each have, respectively, pumps 2, 2a and 2b which in turn are actuated by the electric motors 9, 9a, and 9b. The three pumping apparatus shown in FIG. 6 are each similar to one another and a further description of them is not believed to be either necessary or desirable. For purposes of describing the invention, assume that pump 2 and its motor 9 are for a detergent material, pump 2a and the motor 9a are for an acid material, and pump 2b and its motor 9b are for a sanitizer material.

It is believed sufficient to say that the conduits 23, 23a, and 23b from the three containers discharge into a common mixing tank, and in FIG. 6 this mixing tank takes the form of a chamber C.

The washing unit includes a support frame F fabricated from steel tubing or the like. The control box 35 is rigidly supported on the frame and has a pair of water hoses 40 and 41 extending therefrom for detachable connection to conventional spigots (not shown), respectively, of conventional cold and hot water lines which furnish the necessary water. Also supported on the frame is a conventional electric motor driven fluid pump 43 of the impeller type having its outlet connected to a conduit 44 for delivering the water to the upper side of a tank 45 to be cleaned. The inlet of the fluid pump is connected by a conduit 47 to a nipple 48 in the lower side of the regulating chamber C.

The regulating chamber C is generally cylindrical in shape, upright and may be open at its top. Chamber C is provided at its lower end with a generally cylindrical hollow extension 49 having a regulating chamber drain opening 50 at its upper end and a tank drain opening 51 at its lower end. The sides of the openings 50 and 51 form valve seats for vertically shiftable valve elements in the form of a regulating chamber drain stopper 52 and a tank drain stopper 53, respectively. The bottom of chamber C is provided with a drain hole 54.

The drain stoppers 52 and 53 are connected to the lower end of a stopper rod 55 that extends centrally down into the chamber. The stoppers 52 and 53 are conical in shape and may be of resilient material for good seating, such as rubber. The rod is vertically shiftable and a spring 56 biases the rod downwardly. The rod is raised by the action of the electric solenoid 57 connected to the top end of the rod. The drain solenoid 57 is energized by an electric timer T and its cam t3. (FIG. 7).

When rod 55 is raised by energization of solenoid 57, stopper 52 is raised to open regulating chamber drain opening 50 and stopper 53 is raised to close tank drain opening 51. When rod 55 is lowered by deenergization of solenoid 57, stopper 52 is lowered to close regulating chamber drain opening 50 and stopper 53 is lowered to open tank drain opening 51, as FIG. 6 shows.

The timer T includes cams t1, t2, t3, t4, t5, and t6 for operating the various components, also in the control box, to be described. The timer T is set by a control knob K on the side of the control box 35.

Figure 7:
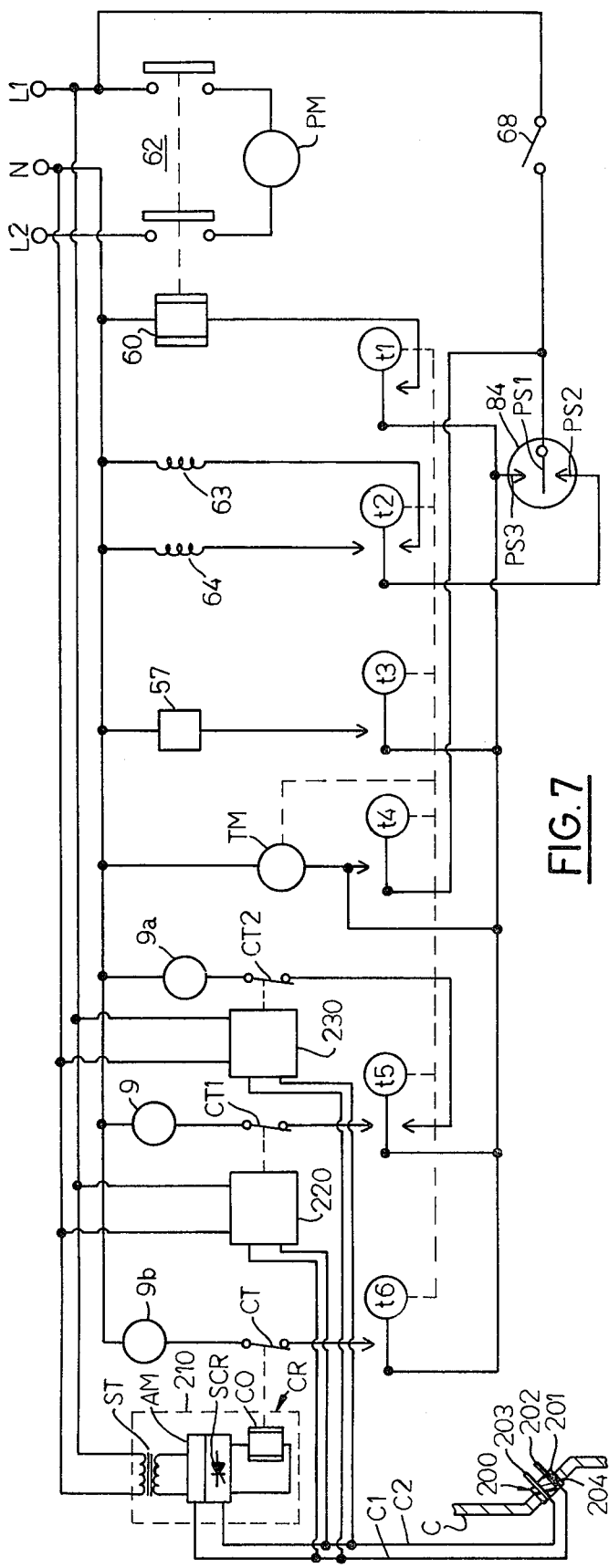
FIG. 7 is an electrical circuit diagram of the control device for the embodiment shown in FIGS. 1 through 6.

As FIG. 7 shows, the timer T and cam t1 control energization of pump contactor coil 60 of a contactor 62 for operating motor PM for pump 43; cam t2 controls energization of the solenoids 63 and 64 for the mixer valve 65 and the hot water valve 66, respectively; cam t3 controls energization of the drain solenoid 57; and cam t4 controls energization of the timer motor TM. Energization of timer motor TM is also controlled by pressure switch 84, as hereinafter explained. As on-off toggle switch 68 is provided, as well as conventional ac power source comprising supply lines L1, L2 and N.

The extension 59 of chamber C also has a nipple 70 between openings 50 and 51 and the passage 71 of the tank 45 is in fluid communication, via conduit 72, with the nipple 70 and chamber C.

Thus, the general flow of fluid is from the supply spigots (not shown), through a mixer valve 65 (operated by a solenoid 63), and down a liquid feeder tube 78 into the chamber C. Water from the hot water line 41 can also be diverted by hot water valve 66 operated by solenoid 64, through a conduit 81 and into chamber C.

It should be noted that the height of the regulating chamber C is set relative to tank 6 being cleaned so that the fluid level in the tank is regulated to, that is the same as, the level of the fluid in chamber C.

The fluid level is controlled or regulated by the level of the fluid in chamber C. Therefore, height of the chamber inlet 70 is about four to eight inches lower than tank outlet 71. For example, assuming the stopper 52 is down and thus closes the discharge outlet 50 of the chamber, the level of the fluid in the chamber C is controlled by a normally closed pressure switch 84 which switch causes closing of the solenoid operated water valve. The switch 84 is actuated by the height of the fluid in a pressure tube 85 extending from the pressure switch downwardly into the chamber. The switch 84 regulates the water valves and consequently the flow of the water to chamber C. The extent to which the pressure tube extends into the chamber determines the height to which the chamber will fill, and this setting need not be adjusted.

An example of a typical cycle of operation is as follows. Assume that unit U and tank 45 are connected, as shown in FIG. 6; that on-off toggle switch 68, shown in FIG. 7 is closed; that the hot and cold water hoses 41 and 40 are being charged with water; and that chamber C is empty.

In order to start the cycle, the cams t1 and t2 must be in a position wherein coil 60 of contactor 62 is connected to contact PS3 of pressure switch 84 and wherein solenoid coil 63 of mix valve 65 is connected to contact PS2 of pressure switch 84. Normally, the cams t1 and t2 assume this position when control knob K of time T is turned to "on" position. At this point, cam t3 assumes a position wherein solenoid coil 57 is de-energized and, therefore, regulating chamber drain opening 50 is closed by stopper 52 and tank drain opening 51 is open. At this point cam t4 assumes a position wherein timer motor TM is not connected directly to line L1. Since chamber C is empty (any water herein having drained out through hole 54), pressure switch 84 connects its contact PS1 to contact PS2 and solenoid 63 for mix valve 65 is energized.

With mix valve 65 open, clean water (at a temperature of 95° F, for example, for cleaning milk from tank 45), enters chambers C and begins to fill it to line F1. When the water rises to line F1, pressure switch 84 operates to disconnect its contact PS1 from contact PS2 and to connect contact PS1 to contact PS3 with the following results: solenoid 63 deenergizes and closes mix valve 65 thereby stopping water flow into chamber C; contactor coil 60 energizes to close contactor 62 and starts pump motor PM and pump 43 driven thereby; and timer motor TM is energized and beings to drive all of its cams.

With pump 43 in operation, rinse water is pumped from chamber C through hoses 47 and 44 into tank 45. From tank 45, the rinse water drains through hose 72 and out tank drain opening 51 which is open. When the water level in chamber C is pumped down to level F3, pressure switch 84 operates to disconnect its contact PS1 from contact PS3 and to connect contact PS1 to contact PS2 with the following results: solenoid 63 energizes to open mix valve 65 to again start water flow into chamber C; contactor coil 60 deenergizes to open contactor 62 and stops pump 43; and timer motor TM is deenergized and stops driving its cams.

Figure 8:
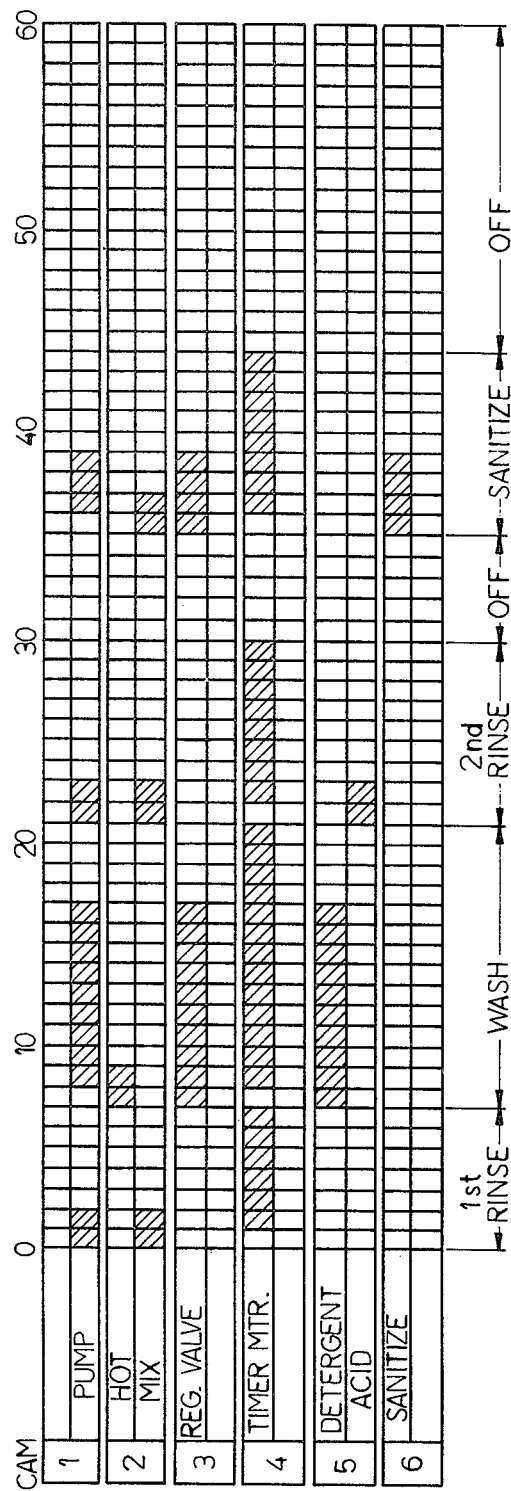
FIG. 8 is a sequential timing chart for the apparatus shown in FIGS. 6 and 7.

The foregoing operation, wherein the chamber C is alternately filled and emptied several times, may be referred to as the spin-burst portion of the first rinse cycle and occurs during the first two minutes, for example, of the cycle, as FIG. 8 shows. During this first two minutes, timer motor TM is energized several times and finally drives its cams into a condition wherein cam t4 maintains timer motor TM connected to line L1, while the other cams cause their contacts to open.

As shown in FIG. 7, cam t5 operates the detergent motor 9 and the acid motor 9a and cam t6 operates the sanitize motor 9b in the sequence indicated by the timing chart shown in FIG. 8.

FIG. 8 shows the timing sequence of the various operations and the various cycles involved in the equipment cleaning operation.

As FIG. 7 shows, control means, including timer T, are provided to operate the individual pumps 9, 9a and 9b and the main pump 43 in a predetermined sequence to provide desired cycles of operation as shown in FIG. 8. The control means further includes means such as a probe 200 for sensing the amount of an ingredient being added by an individual pump 9, 9a, or 9b during an appropriate cycle and for stopping that individual pump when a predetermined amount of the ingredient has been added. As FIG. 7 shows, probe 200 comprises a electrically non-conductive body 201 which extends through an opening 204 in the bottom of regulating chamber C (as shown also in FIG. 6), and comprises a pair of electrically conductive, spaced-apart terminals 202 and 203 which extend into the cleaning solution in regulating chamber C when a cleaning solution is being mixed. The probe 200 is connected to operate three control units designated 210, 220, and 230. The three control units are identical to each other in construction and mode of operation, and, therefore, a detailed description of control unit 210 will suffice. The control unit 210 comprises a step-down transformer ST which has its primary winding connected across the power supply transformers L1 and N. The secondary winding of transformer ST is connected to supply a solid state amplifier designated AM. The solid state amplifier AM is connected by conductors C1 and C2 to the terminals 202 and 203, respectively, of probe 200. The solid state amplifier AM is responsive or sensitive to the level or degree of electrical conductivity of the cleaning solution between the probe terminals 202 and 203, and when the conductivity level reaches a predetermined level, the amplifier AM triggers a silicon controlled rectifier SCR to effect energization of the coil CO of a control relay CR, and the coil CO controls operation of a normally closed contact CT. The contact CT is connected in series circuit between the sanitize pump motor 9b and the contact controlled by the timer cam t6. As hereinbefore mentioned, contact CT is normally closed, and the timer T operates as hereinbefore explained to effect energization of sanitize pump motor 9b. However, when the conductivity of the cleaning solution to which probe 200 is exposed reaches a certain level, the control unit 210 is actuated to effect opening of contact CT and deenergize sanitize pump motor 9b. As FIG. 7 shows, the control units 220 and 230 have normally closed contacts CT1 and CT2, respectively. Contact CT1 is in series circuit with the detergent pump motor 9 and the contact controlled by timer cam t5. Contact CT2 is connected in series circuit between the acid pump motor 9a and the contact therefor controlled by timer cam t5. As FIG. 7 shows, the control units 220 and 230 are also actuated or operated by probe 200.

The control unit 210 may take the form of a commercially available type of control unit. In an actual embodiment of the present invention, applicant employed a Model LCS/LHS control unit which is available from Curtis Industries, Inc., 8000 West Tower Avenue, Milwaukee, Wisconsin, 53223, which is described in detail in that company's catalog No. 1074. In an actual embodiment of the invention, the control unit 210 applied 24 volts of alternating current across the terminals 202 and 203 of probe 200 and the unit had an adjustable sensitivity control (not shown). The probe 200 and the control unit 210 were responsive to the presence of an acid solution and to a base solution. Probe 200 and control unit 210 operate on the principle that when cleaning chemicals or ingredients, when added to ordinary tap water to form the cleaning solution, formed electrolytes whose conductance changes in proportion with the amount of chemical added. Although electrolytic conductance can be readily converted to a conventional pH scale, the circuitry disclosed in the present application does not differentiate between acid or base solutions. Such discrimination is unnecessary in the present control system because it is known that during a wash cycle, for example, detergent (a base) will be added to the water solvent to form the solution. This base solution changes the wash water conductivity in the direction of pH 14 and the conductance of that solution will change in proportion. At any calibrated set point along this scale, the amount of electric current passing between the contacts 202 and 203 of probe 200 can trigger the control unit 220 to control the motor 9 for the detergent dispensing pump. On the other hand, acid for the second rinse cycle will change the rinse solution in the direction of pH1 but amplifier circuit 230 will still sense the current flow and trigger its adjustable set point. For example, as FIG. 8 shows, a predetermined sequence may comprise a first rinse cycle, a wash cycle, a second rinse cycle, an OFF cycle, a sanitizer cycle, and a final OFF cycle. During the first rinse cycle, the main pump 43 but no piston-type pump operates. During the wash cycle, the main pump 43 and the detergent pump 9 operate. During the second rinse cycle, the main pump 43 and the acid pump 9a operate. During the sanitize cycle, the main pump 43 and the sanitize pump 9b operate. During both OFF cycles, neither the main pump 43 nor any piston-type pumps operate. During a cycle of operation when a piston-type pump 9, 9a, or 9b is operating, in response to operation of the timer means T, the sensing means, which includes probe 200 for detecting the pH level of the cleaning solution, senses when a predetermined desired pH level is reached (indicative that a solution of proper strength is available) and stops that particular piston-type pump.

FIGS. 9-11

Figure 9:
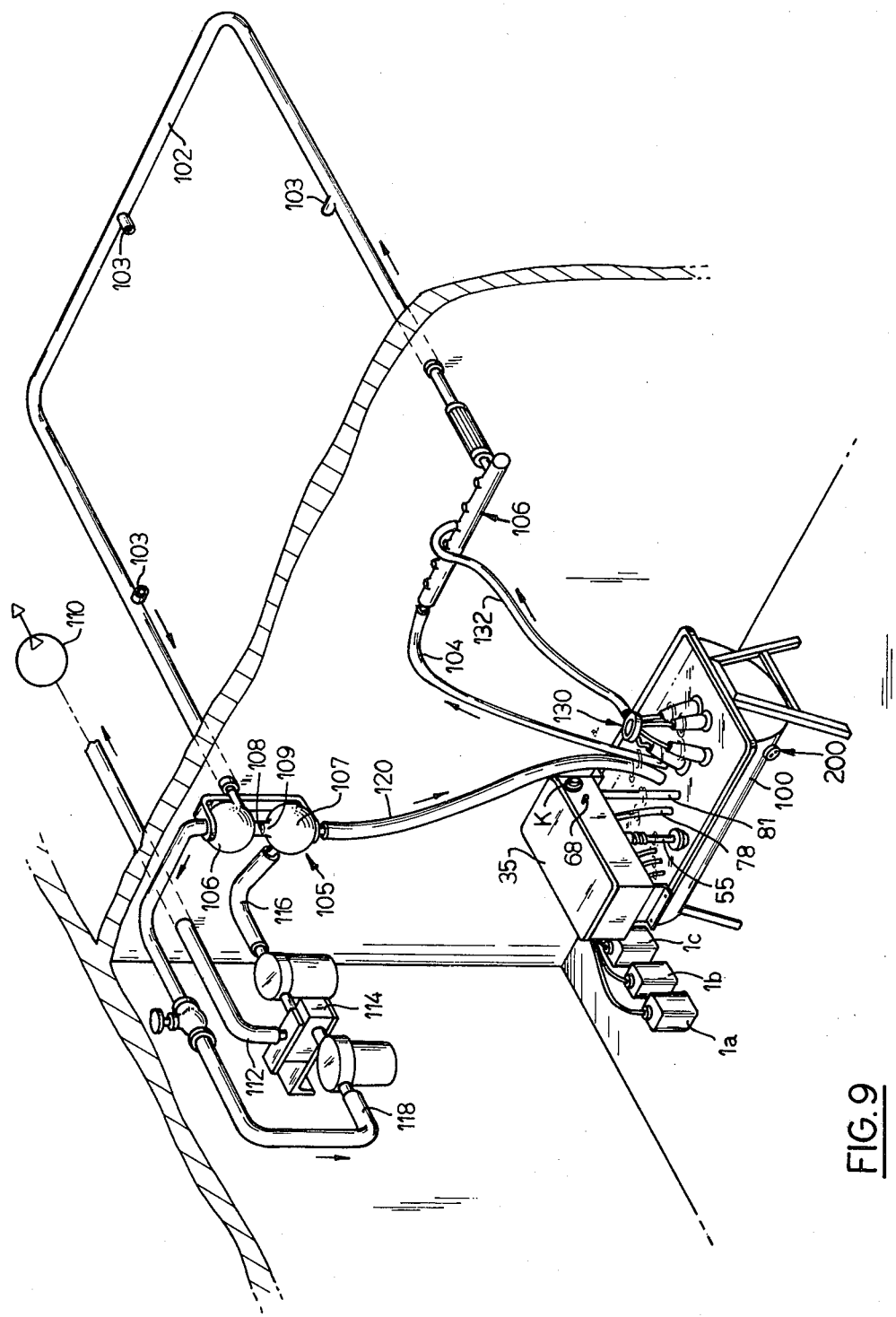
FIG. 9 shows the present invention when used for cleaning dairy fluid line equipment.
Figure 10:
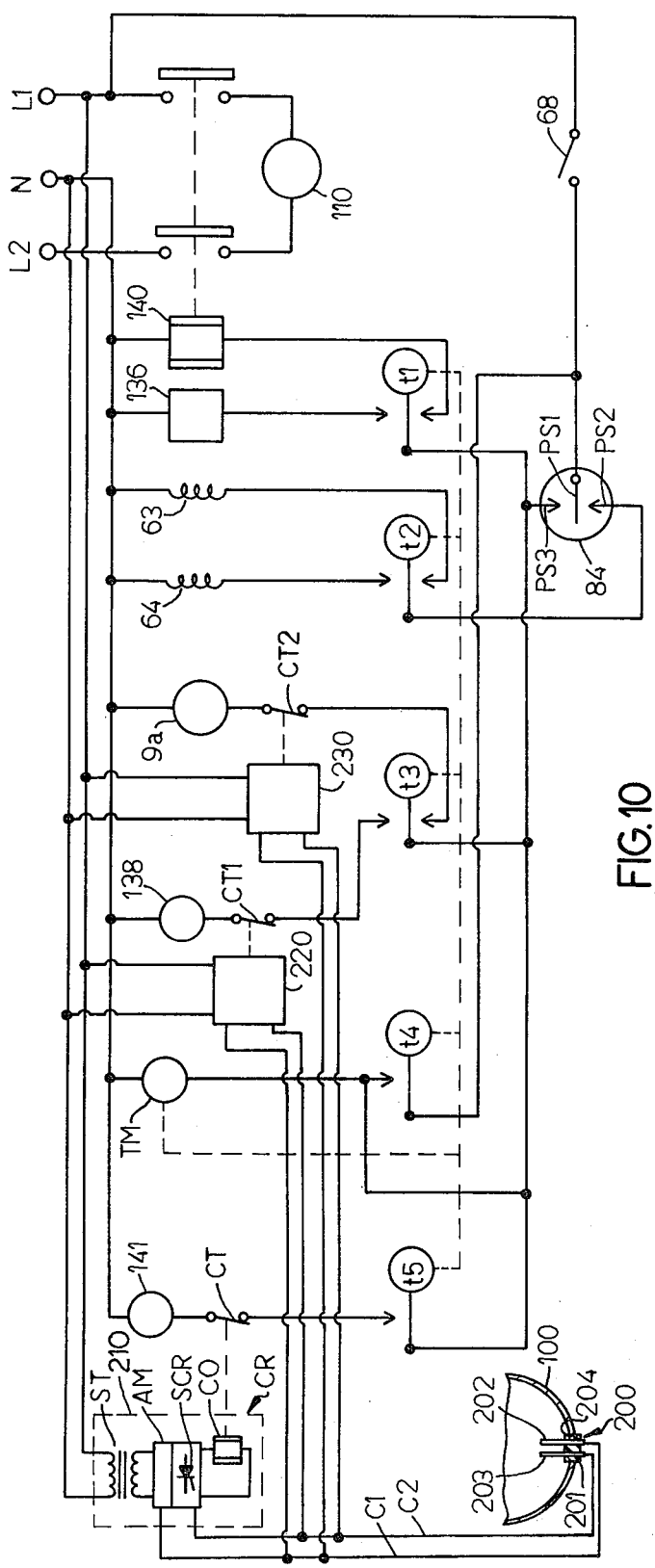
FIG. 10 is an electrical circuit diagram of the control device for the embodiment shown in the FIG. 9.
Figure 11:
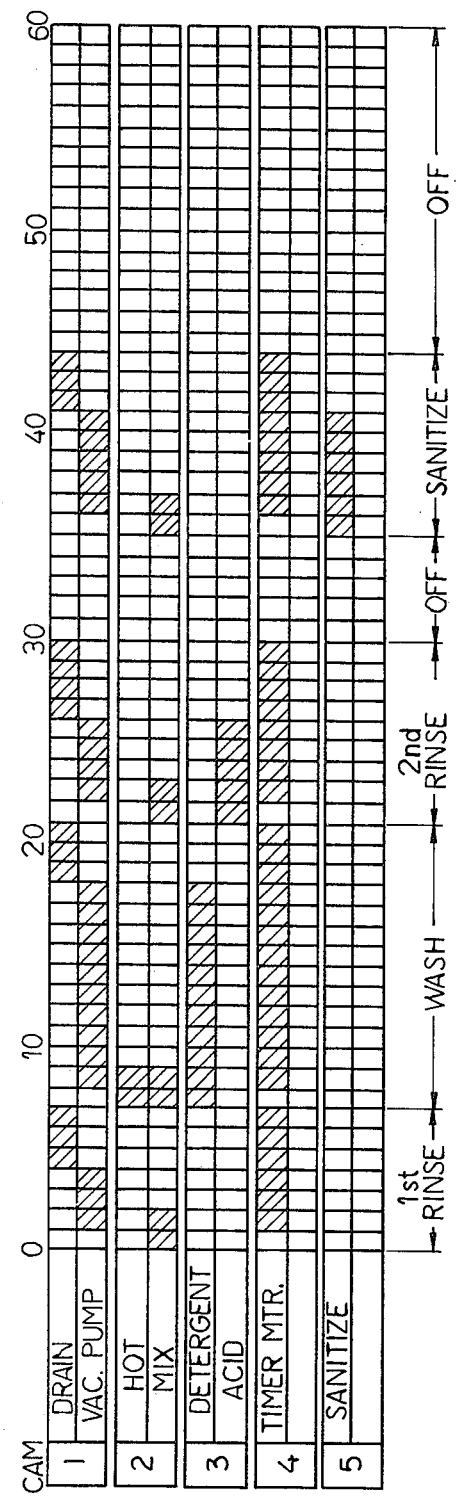
FIG. 11 is a sequential timing chart for the apparatus shown in FIGS. 9 and 10.

The invention has been shown in FIGS. 9 to 11 as applied to a milk line system location in a dairy barn for example, and of the general type shown in the said U.S. Pat. No. 3,191,576 and particularly in FIG. 8 thereof. It is believed sufficient to say for purposes of this disclosure that the milk line system includes a solution tank 100 on which the control box 35 is mounted. A continuous milk line 102 runs throughout the dairy barn and has a series of nipples 103 connected thereto and to which are connected the milking units (not shown). A flexible conduit 104 conveys the fluid from the tank 100 through a manifold 106 and to the milk line 102. A vacuum receiver 105 receives the fluid line 102 in its upper bowl 106. The receiver 105 is of a two bowl type and also includes a lower bowl 107 which is in communication with the upper bowl which includes a check valve 108 in the connecting neck 109. As clearly taught in said U.S. Pat. No. 3,191,576, a vacuum pump 110 draws a continuous vacuum through line 112, which line is connected by means of a slide valve 114 to each of conduits 116 and 118. Conduit 118 is in communication with the upper bowl 106 which conduit 116 is in communication with the lower bowl 107. The valve 114 is automatically shifted by a timing means as taught in said '576 patent so that the upper bowl 106 is subjected to a continuous vacuum while the lower bowl 107 is subjected alternately to atmospheric pressure and then to a vacuum. The action is such that the vacuum receiver 105 acts to periodically draw slugs of fluid from the line 102 and then when the receiver is full, it permits the fluid to be discharged back into the tank via conduit 120. In this manner, the vacuum receiver 105 which is actuated by the vacuum pump 110, acts to pull cleaning fluid through the line 102 and then return the fluid via conduit 120 to the tank 100. As the above operation is fully shown and described in the said '576 patent, further description is not believed to be necessary.

The manifold 106 is provided so that any number of a series of teat cup assemblies 130 may be placed in communication with the manifold by means of a conduit 132. The teat cup assemblies themselves are of conventional character and may be of the type shown in U.S. Pat. No. 3,173,434 issued Mar. 16, 1965, to Lloyd F. Bender. Thus, any number of teat cup assemblies may be connected to the manifold and the cleaning fluid is drawn up through the cleaning assemblies for complete cleaning thereof, in addition to the cleaning operation of the milk line 102.

The electrical circuit shown in FIG. 10 is generally the same arrangement as shown in the FIG. 7 circuit and includes the timer motor TM and the five cams driven by the timer motor which cams in turn operate certain of the various components as heretofore described. It will be noted however, that the drain solenoid 136 for the drain rod 55 of the tank 100 is operated by the timer t1. The contactor solenoid 140 is also operated by the timer t1. The detergent motor 138 and the acid motor 9a are operated by the timer t3, while the sanitize motor 141 is operated by the timer t5. Parts similar in FIG. 10 to those shown in FIG. 7 are correspondingly numbered.

FIG. 11 shows the timing chart for the various components shown in FIG. 10 and illustrate the sequence and time of operation of the various components for the various phases of operation of a washing program.

As FIG. 10 shows, control means, including timer T, are provided to operate the individual pumps 141, 9a and 138 and the main pump 43 in a predetermined sequence to provide desired cycles of operation as shown in FIG. 11. The control means further includes means such as a probe 200, hereinbefore described in connection with FIG. 7, for sensing the amount of an ingredient being added by an individual pump 141, 9a, or 138 during an appropriate cycle and for stopping that individual pump when a predetermined amount of the ingredient has been added. As FIG. 10 shows, probe 200 comprises an electrically non-conductive body 201 which extends through an opening 204 in the bottom of solution tank 100, and comprises a pair of electrically conductive, spaced-apart terminals 202 and 203 which extend into the cleaning solution in tank 100 when a cleaning solution is being mixed. The probe 200 is connected to operate three control units designated 210, 220, and 230. The three control units are identical to each other in construction and mode of operation and have been hereinbefore described. As FIG. 10 shows, the control unit 210 comprises a step-down transformer ST which has its primary winding connected aross the power supply transformers L1 and N. The secondary winding of transformer ST is connected to supply a solid state amplifier designated AM. The solid state amplifier AM is connected by conductors C1 and C2 to the terminals 201 and 203, respectively, of probe 200. The solid state amplifier AM is responsive or sensitive to the level or degree of electrical conductivity of the cleaning solution between the probe terminals 201 and 203, and, when the conductivity level reaches a predetermined level, the amplifier AM triggers a silicone controlled rectifier SCR to effect energization of the coil CO of a control relay CR, and the coil CO controls operation of a normally closed contact CT. In FIG. 10 the contact CT is connected in series circuit between the sanitize pump motor 141 and the contact controlled by the timer cam t5. As hereinbefore mentioned, contact CT is normally closed, and the timer T operates as hereinbefore explained to effect energization of sanitize pump motor 141. However, when the conductivity of the cleaning solution to which probe 200 is exposed in tank 100 reaches a certain level, the control unit 210 in FIG. 10 is actuated to effect opening of contact CT and deenergize sanitize pump motor 141. As FIG. 10 shows, the control units 220 and 230 have normally closed contacts CT1 and CT2, respectively. Contact CT1 is in series circuit with the detergent pump motor 138 and the contact controlled by timer cam t3. Contact CT2 is connected in series circuit between the acid pump motor 9a and the contact therefor controlled by timer cam t3. As FIG. 10 shows, the control units 220 and 230 are also actuated or operated by probe 200.

The principles of operation of the control units 210, 220 and 230 have hereinbefore been described. The base solution formed by the detergent and water solvent changes the wash water conductivity in the direction of pH 14 and the conductance of that solution will change in proportion. At any calibrated set point along this scale, the amount of electric current passing between the contacts 202 and 203 of probe 200 can trigger the control unit 220 to control the motor 138 for the detergent dispensing pump. On the other hand, acid for the second rinse cycle will change the rinse solution in the direction of pH1 but amplifier circuit 230 will still sense the current flow and trigger its adjustable set point. For example, as FIG. 11 shows, a predetermined sequence may comprise a first rinse cycle, a wash cycle, a second rinse cycle, an OFF cycle, a sanitizer cycle, and a final OFF cycle. During the first rinse cycle, the main pump 43 but no piston-type pump operates. During the wash cycle, the main pump 43 and the detergent pump 138 operate. During the second rinse cycle, the main pump 43 and the acid pump 9a operate. During the sanitize cycle, the main pump 43 and the sanitize pump 141 operate. During both OFF cycles, neither the main pump 43 nor any piston-type pumps operate. During a cycle of operation when a piston-type pump 141, 9a, or 138 is operating, in response to operation of the timer means T, the sensing means, which includes probe 200 for detecting the pH level of the cleaning solution, senses when a predetermined desired pH level is reached (indicative that a solution of proper strength is available) and stops that particular piston-type pump.

GENERAL

The present invention as above described includes a control system having a series of plunger type pumps which each in turn have their own separate containers from which they draw material that is mixed to define a cleaning solution. The pumps are operated by electric motors which in turn are programmed by a timer. The system also includes a fluid moving device and in FIGS. 5-7, this is comprised of a pump 43 driven by the pump motor PM whereas in the FIGS. 9-11 embodiment, the fluid moving device is the vacuum releaser 120 which is driven by the vacuum pump 110. Other forms of fluid moving devices may be utilized with the present invention such as agitators in a vessel to be washed. In either embodiment, the fluid moving device is controlled by an electrical contactor means.

I claim:

1. In apparatus for mixing a cleaning solution of predetermined pH value for circulation through dairy equipment, in combination:
    a container having a cleaning ingredient therein;
    a mixing receptacle having a solvent therein;
    a pump for supplying said cleaning ingredient from said container to said mixing receptacle for mixture with said solvent to form said cleaning solution; and
    control means, said control means including timing means to effect activation of said pump for a predetermined interval of time,
    said control means further including means for sensing the pH value of the said cleaning solution as said cleaning ingredient is being supplied to said mixing receptacle by said pump and for effecting deactivation of said pump when a predetermined pH value is reached and before expiration of said predetermined interval of time.

2. Apparatus according to claim 1 including first means for conveying said cleaning solution from said mixing receptacle to said equipment and wherein said control means effects operation of said first means.

3. Apparatus according to claim 1 including second means for supplying said solvent to said receptacle and wherein said control means effects operation of said second means.

4. Apparatus according to claim 1 wherein said means for sensing the pH value of said cleaning solution comprises a probe which senses the electrical conductivity of said cleaning solution.

5. Apparatus according to claim 4 wherein said control means includes an electric relay controlled by said probe for effecting deactivation of said pump.

6. In apparatus for mixing a cleaning solution of predetermined pH value for circulation through dairy equipment, in combination:
    a container having a cleaning ingredient therein;
    a mixing receptacle;
    first means for supplying a solvent to said receptacle;
    a pump for supplying said cleaning ingredient from said container to said mixing receptacle for mixture with said solvent to form said cleaning solution;
    second means for conveying said cleaning solution from said mixing receptacle to said dairy equipment; and
    control means for operating said first and second means and said pump, said control means including timing means to effect activation of said pump for a predetermined interval of time,
    said control means further including means for sensing the pH value of the said cleaning solution as said cleaning ingredient is being supplied to said mixing receptacle by said pump and for effecting deactivation of said pump when a predetermined pH value is reached and before expiration of said predetermined interval of time.

7. Apparatus according to claim 6 wherein said means for sensing the pH value of said cleaning solution comprises a probe which senses the electrical conductivity of said cleaning solution.

8. Apparatus according to claim 7 wherein said control means includes an electric relay controlled by said probe for effecting deactivation of said pump.

9. In apparatus for mixing different cleaning solutions of predetermined pH values for circulation through dairy equipment in a predetermined sequence, in combination:
    a plurality of containers each having a cleaning ingredient therein;
    a mixing receptacle;
    first means for supplying a solvent to said receptacle;
    a plurality of pumps for supplying cleaning ingredients from said containers to said receptacle for mixture with the solvent to form said cleaning solutions, each pump being adapted to supply a different cleaning ingredient; and
    control means for operating said first means and said pumps, said control means including timing means to effect activation of said pumps in said predetermined sequence and for activating each pump for a predetermined interval of time,
    said control means further including means for sensing the pH value of each cleaning solution as a cleaning ingredient is being supplied to said mixing receptacle by a particular pump and for effecting deactivation of said particular pump when the cleaning solution reaches a predetermined pH value and before expiration of the predetermined interval of time during which said pump would otherwise operate.

10. Apparatus according to claim 9 including second means for conveying each cleaning solution from said mixing receptacle to said equipment and wherein said control means effects operation of said means.

11. Apparatus according to claim 9 wherein said means for sensing the pH value of said cleaning solution comprises a probe which senses the electrical conductivity of said cleaning solution.

12. Apparatus according to claim 11 wherein said control means includes a plurality of electric relays controlled by said probe for effecting deactivation of said pumps.

13. In apparatus for mixing different cleaning solutions of predetermined pH value for circulation through dairy equipment in a predetermined sequence, in combination:

a plurality of containers each having a cleaning ingredient therein;

a mixing receptacle;

first means for supplying a solvent to said receptacle;

second means for conveying said cleaning solutions from said mixing receptacle to said dairy equipment;

a plurality of pumps for supplying cleaning ingredients from said containers to said receptacle for mixture with the solvent to form said cleaning solutions, each pump being adapted to supply a different cleaning ingredient; and control means for said first and second means and for said pumps, said control means including timing means to effect activation of said pumps in said predetermined sequence and for activating each pump for a predetermined interval of time, said control means further including means for sensing the pH value of each cleaning solution as a cleaning ingredient is being supplied to said mixing receptacle by a particular pump and for effecting deactivation of said particular pump when the cleaning solution reaches a predetermined pH value and before expiration of the predetermined interval of time during which said pump would otherwise operate.

14. Apparatus according to claim 13 wherein said means for sensing the pH value of said cleaning solution comprises a probe which senses the electrical conductivity of said cleaning solution.

15. Apparatus according to claim 14 wherein said control means includes a plurality of electric relays controlled by said probe for effecting deactivation of said pumps.

16. In apparatus for mixing different cleaning solutions of predetermined pH value for circulation through dairy equipment in a predetermined sequence, in combination:

a plurality of containers each having a cleaning ingredient therein;

a mixing receptacle;

first means for supplying a solvent to said receptacle;

second means for conveying said cleaning solutions from said mixing receptacle to said dairy equipment;

a plurality of pumps for supplying cleaning ingredients from said containers to said receptacle for mixture with the solvent to form said cleaning solutions, each pump being adapted to supply a different cleaning ingredient; and control means for said first and second means and for said pumps, said control means including timing means to effect operation of said first and second means and activation of said pumps in said predetermined sequence and for activating each pump for a predetermined interval of time, said control means further including electric probe means for sensing the pH value of each cleaning solution by sensing the electrical conductivity of said cleaning solution as a cleaning ingredient is being supplied to said mixing receptacle by a particular pump and electric relay means responsive to said probe for effecting deactivation of said particular pump when the cleaning solution reaches a predetermined pH value and before expiration of the predetermined interval of time during which said pump would otherwise operate.

17. Apparatus according to claim 16 wherein said cleaning solutions include acid and base solutions and wherein alternating current is applied to said probe to sense the electrical conductivity of said cleaning solutions.

18. In apparatus for mixing a cleaning solution of predetermined composition for circulation through liquid handling equipment, in combination:

a container having a cleaning ingredient therein;

a mixing receptacle having a solvent therein;

a pump for supplying a cleaning ingredient from said container to said receptacle for mixture with said solvent to form said cleaning solution; and control means, said control means including timing means to effect activation of said pump for a predetermined interval of time, said control means further including means for sensing the composition of the said cleaning solution as said cleaning ingredient is being supplied to said mixing receptacle by said pump and for effecting deactivation of said pump when a predetermined composition is reached and before expiration of said predetermined interval of time.

19. Apparatus according to claim 18 including first means for conveying said cleaning solution from said mixing receptacle to said equipment and wherein said control means effects operation of said first means.

20. Apparatus according to claim 18 including second means for supplying said solvent to said receptacle and wherein said control means effects operation of said second means.

21. Apparatus according to claim 18 wherein said means for sensing the composition of said cleaning solution comprises a probe which senses the electrical conductivity of said cleaning solution.

22. Apparatus according to claim 21 wherein said control means includes an electric relay controlled by said probe for effecting deactivation of said pump.

* * * * *